Sept. 10, 1929. R. KOGURE 1,727,832
APPARATUS FOR OPENING AND SHUTTING A FILTER PRESS
Filed May 3, 1928
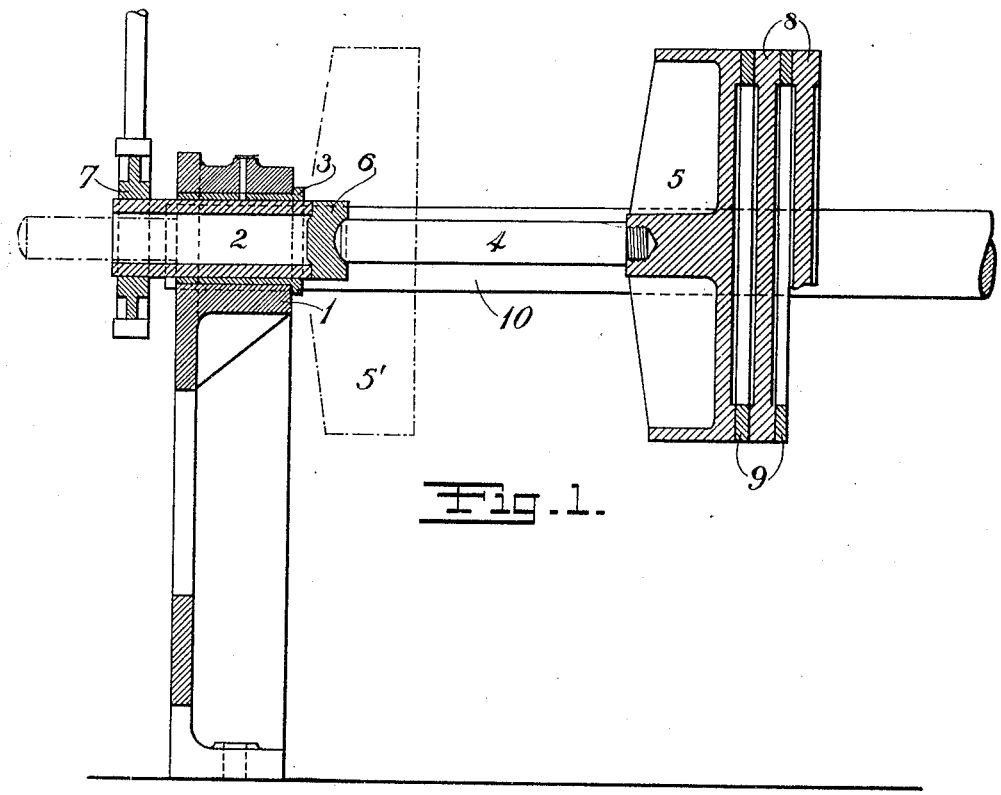
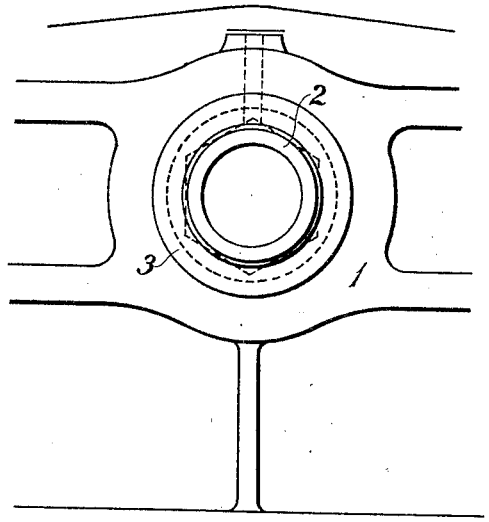
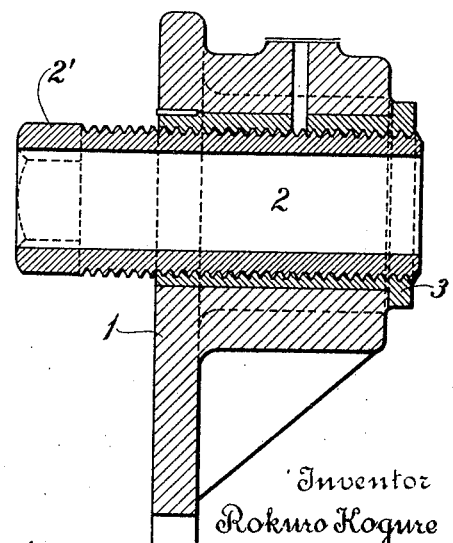
Inventor
Rokuro Kogure
By his Attorneys Patented Sept. 10, 1929.

1,727,832

UNITED STATES PATENT OFFICE.

ROKURO KOGURE, OF KAWASAKI, KANAGAWA KEN, JAPAN.

APPARATUS FOR OPENING AND SHUTTING A FILTER PRESS.

Application filed May 3, 1928, Serial No. 274,782, and in Japan May 5, 1927.

The present invention relates to an improvement in an apparatus for opening and shutting a filter press using a screw compressing device, consisting in this that a compressing screw or a screw and a compressing member commonly used as an apparatus for opening and shutting a filter press are replaced by a hollow screw and a rod having a diameter sufficient to pass it through the said hollow freely and fixed to the center of the back of a terminal plate at the right angle and a supporting member which connects the above hollow screw and rod vertically when the filter press is shut. The object of this invention is to make rapid and easy the operation of the compressing screw by reducing considerably the stroke necessary for opening and shutting the filter press.

In the accompanying drawing, the same numbers refer to the same parts.

Fig. 1 is a longitudinal section of the essential part of the filter press provided with the apparatus of this invention, Fig. 2, a section of the screw device of the same and Fig. 3, a front view of the same.

The essential parts of this invention consist of a hollow screw rod 2 adapted for a nut 3 inserted tightly in a round hole at the center of the upper part of a foreleg 1, a connecting rod 4 fixed at the right angle to the center of the back of a terminal plate 5 and movable horizontally on the same center line as the screw rod 2 according to the motion of the said terminal plate, and a supporting member 6 inserted between the screw rod and the connecting rod to prevent the latter from running into the former and at the same time to transmit the thrust of the former to the latter. The screw rod 2 is a hollow cylinder having a thread curved on large part of its outer wall, one end of which is curved polygonally as shown in 2' to facilitate the insertion of a spanner 7. The connecting rod 4 is of a cylindrical shape and is capable of going into or out of the hollow of the screw rod freely if not prevented by the supporting member 6. Its length including the thickness of the supporting member 6 is almost equal to the stroke of a filter plate 8 and a filter frame 9. The supporting member 6 is a little metal piece having on one side the projection adapted for the hollow of the screw rod and on the back a recess for receiving the head of the connecting rod. It can be easily fixed or detached.

The closed condition of the filter press consisting of a combination of the abovementioned features is as shown in Figure 1. If it is desired to open it, move the screw rod 2 slightly to the left by turning it with the spanner 7 and detach the supporting member 6. Next, move the terminal plate 5 to the left along the upper surface of the supporting frame 10, and then the connecting rod 4 will move through the hollow of the screw rod 2 till the back of the terminal plate 5 comes into contact with the inner end of the screw rod 2 or the nut 3. The position of the terminal plate and the connecting rod in this case is as shown in 5' and 4' respectively. Thus, after work is done, the filter press may be closed by the operation quite opposite to the above.

Both in opening and shutting the filter press, the stroke of the screw rod 2 only equal to the time required in fixing or detaching the supporting member 6 is sufficient, and therefore only several revolutions will do. This shortens the working hour considerably and prevents the waste of labor. In fact, this is one of the advantages of the present invention.

As the natural consequence of making the screw rod 2 hollow, its outer diameter is much increased, and as in the pitch of the same screw the degree of inclination of the thread is very slow, small force can give the same thrust to the terminal plate as compared with the screw rod or the connecting rod, thus enabling the filter press to shut easily. This is the other advantage to be obtained from the present invention.

Claims:

1. In a closure for filter presses, a head, a support in alinement with and spaced from said head, a nut carried by said support and alined with the head, a telescopic strut having one section in engagement with the head and its other section screwed into said nut, means to rotate the threaded section, and means to hold the sections releasably against telescopic movement.

2. In a closure for filter presses, a head, a support in alinement with and spaced from said head, a nut carried by said support and alined with the head, a tubular member screwed through said nut and open at the end next the head, a post projecting from the head in alinement with the screw and adapted to fit in said screw, means to rotate said screw, and a closure for the open end of the screw to prevent telescoping of the post in the screw.

3. In a closure for filter presses, a head, a support in alinement with and spaced from said head, a nut carried by said support and alined with the head, a tubular member screwed through said nut and open at the end next the head, a post projecting from the head in alinement with the screw and adapted to fit in said screw, means to rotate said screw, and a closure for the open end of the screw to prevent telescoping of the post in the screw and comprising a cylindrical block having one end reduced to fit in the screw and its other end provided with a socket to receive the end of said post.

ROKURO KOGURE.